US005508873A

United States Patent [19]

knapp et al.

[11] Patent Number: 5,508,873

[45] Date of Patent: Apr. 16, 1996

[54] PRIMARY SURGE PROTECTOR FOR BROADBAND COAXIAL SYSTEM

[75] Inventors: Walter knapp, Santa Barbara; Manfred W. Wilms, Goleta, both of Calif.

[73] Assignee: Joslyn electronic Systems Corporation, Goleta, Calif.

[21] Appl. No.: 509,204

[22] Filed: Jul. 31, 1995

[51] Int. Cl.$^6$ .......... H02H 9/04

[52] U.S. Cl. .......... 361/119; 361/124

[58] Field of Search .......... 361/119, 120, 361/113, 124, 125

[56] References Cited

U.S. PATENT DOCUMENTS

| | | | |
|---|---|---|---|
| 3,703,665 | 11/1972 | Yereance et al. | 317/61 |
| 3,863,111 | 1/1975 | Martzloff | 317/61.5 |
| 4,023,071 | 5/1977 | Fussell | 361/56 |
| 4,099,217 | 7/1978 | Fitchew | 361/56 |
| 4,158,869 | 6/1979 | Gilberts | 361/118 |
| 4,188,561 | 2/1980 | Pranke et al. | 361/124 |
| 4,199,736 | 4/1980 | McTaggart et al. | 333/17 L |
| 4,208,694 | 6/1980 | Gilberts | 361/119 |
| 4,241,374 | 12/1980 | Gilberts | 361/124 |
| 4,249,224 | 2/1981 | Baumbach | 361/124 |
| 4,288,833 | 9/1981 | Howell | 361/124 |
| 4,308,566 | 12/1981 | Imataki et al. | 361/125 |
| 4,321,649 | 3/1982 | Gilberts | 361/119 |
| 4,359,764 | 11/1982 | Block | 361/119 |
| 4,467,390 | 8/1984 | Carpenter, Jr. | 361/56 |
| 4,493,003 | 1/1985 | Mickelson et al. | 361/119 |
| 4,502,087 | 2/1985 | Huvet | 361/119 |
| 4,633,359 | 12/1986 | Mickelson et al. | 361/119 |
| 4,663,692 | 5/1987 | Carothers et al. | 361/117 |
| 4,734,823 | 3/1988 | Cunningham | 361/125 |
| 4,862,311 | 8/1989 | Rust et al. | 361/91 |
| 4,866,562 | 9/1989 | Jones | 361/119 |
| 4,910,632 | 3/1990 | Shiga et al. | 361/127 |
| 5,224,012 | 6/1993 | Smith | 361/119 |
| 5,278,720 | 1/1994 | Bird | 361/119 |
| 5,384,679 | 1/1995 | Smith | 361/119 |

OTHER PUBLICATIONS

Pending U.S. patent application, U.S. Ser. No. 08/145,337, filed Oct. 29, 1993, naming Hans-Wolfgang Oertel and David Martin as inventors.

Joslyn Drawing No. 1061–1063, Sep./84.

Joslyn Drawing No. 82140, Sep./75.

"Surge Absorber"—Okaya Electric Industries Co., Ltd.—Catalog-277-91, no date.

"Advancing Electronic Technology"—Semitron, no date.

"TII Coaxial Protection", presented to Protection Engineers Group meeting, Portland, Oregon, May 18, 1995.

*Primary Examiner*—Todd Deboer

*Attorney, Agent, or Firm*—Marshall, O'Toole, Gerstein, Murray & Borun

[57] ABSTRACT

A surge protector is adapted for a broadband coaxial system in which electrical signals having a frequency range from DC to one gigahertz are transmitted. The surge protector has a pair of coaxial cable connectors, a surge protection device, and a fail-short mechanism. The fail-short mechanism has a first operating condition in which the center and outer conductors of the coaxial cable connectors are isolated from each other and a second operating condition in which the center and outer conductors of the coaxial cable connectors are conductively coupled to each other. The impedance of the fail-short mechanism allows the surge protector to have an insertion loss with a magnitude not greater than about −0.2 decibels and a return loss having a magnitude of at least about −20 decibels, and the fail-short mechanism is adapted to conduct a fail-short current having a magnitude of at least about 30 amperes for at least about 15 minutes when the fail-short mechanism is in its second operating condition.

32 Claims, 3 Drawing Sheets

*Fig. 2*
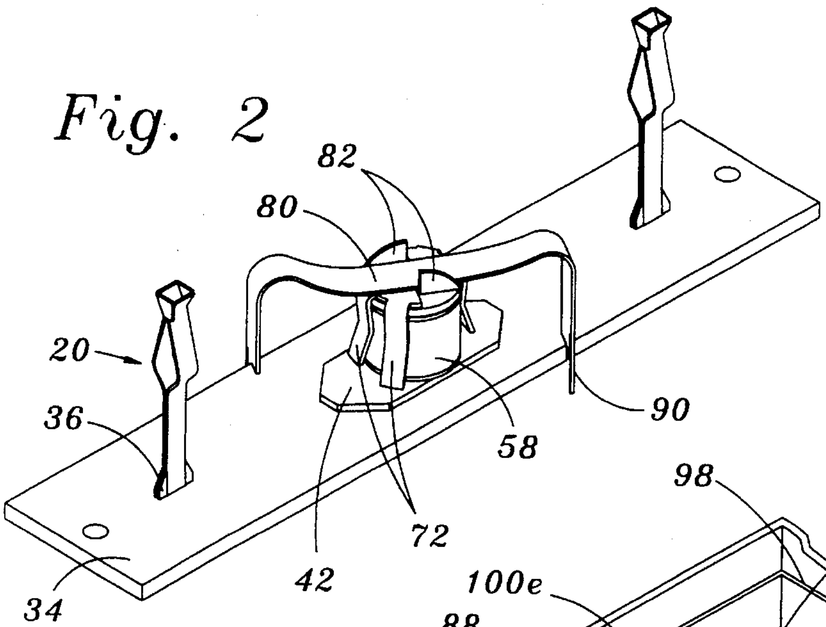
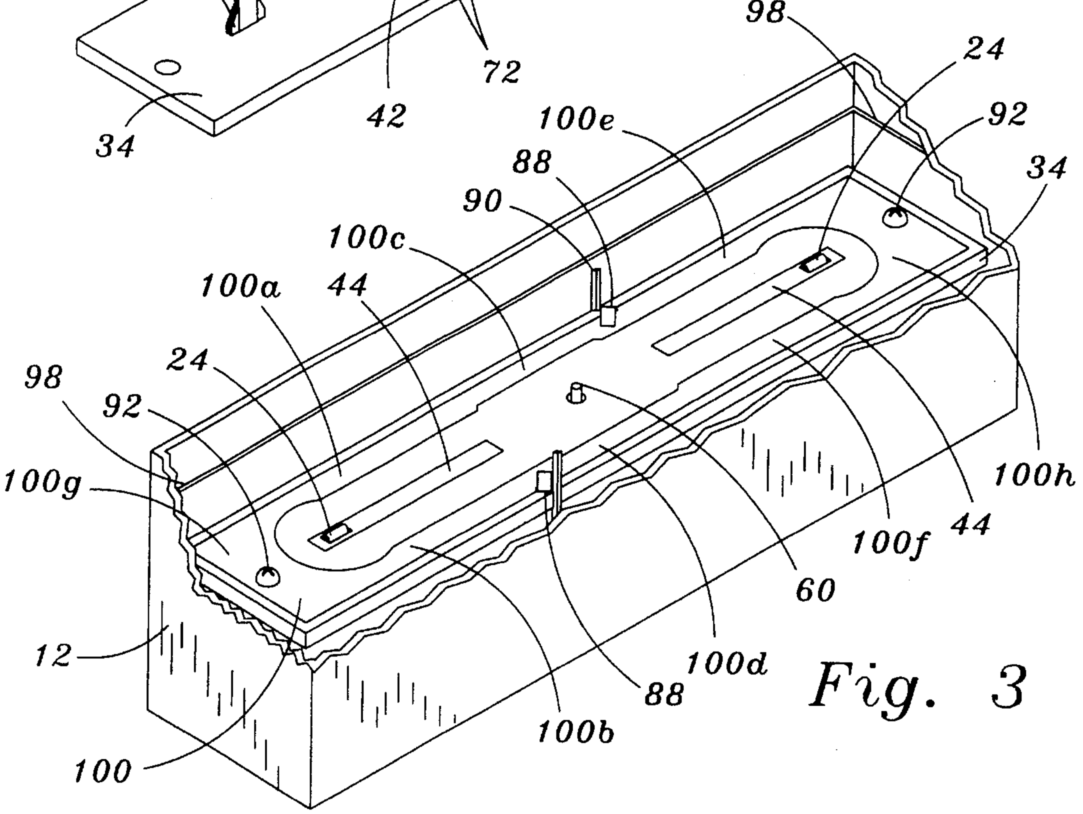
*Fig. 3*
*Fig. 4*
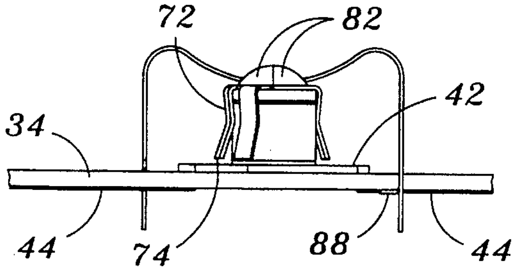

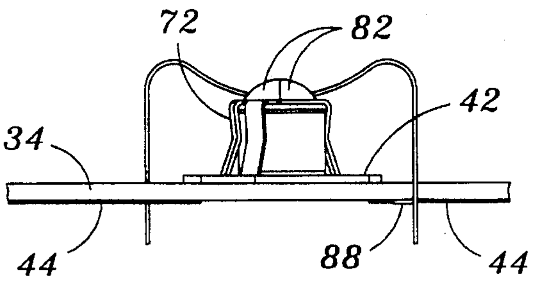
Fig. 5
Fig. 6
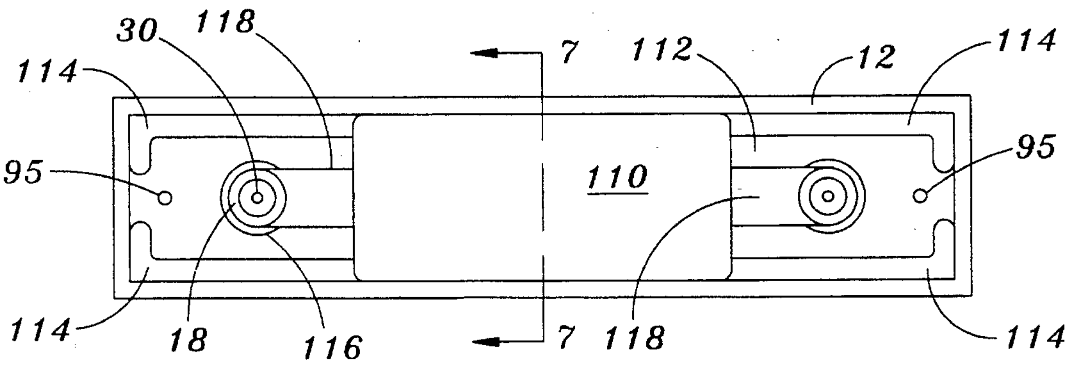
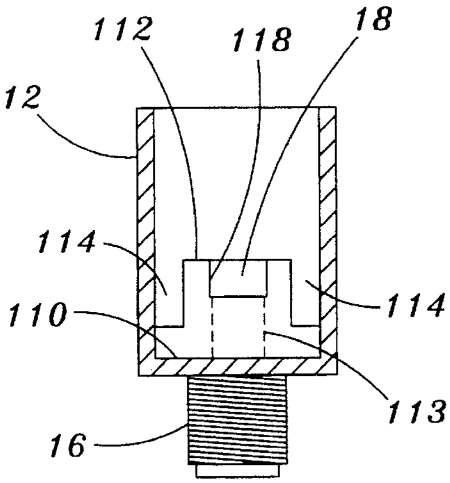
Fig. 7

PRIMARY SURGE PROTECTOR FOR BROADBAND COAXIAL SYSTEM

BACKGROUND OF THE INVENTION

The invention relates to a surge protector designed to provide surge protection for broadband coaxial systems and which incorporates both a surge protection device and a fail-short mechanism.

Various types of surge protectors are used to protect electrical equipment from electrical power surges induced by lightning for example. When connected between an electrical conductor and ground, a conventional surge protector conducts electrical current only when a power surge having a voltage in excess of a predetermined voltage occurs on the conductor, in which case the power surge is transmitted through the surge protector from the conductor to ground.

Some surge protectors are also provided with a fail-short mechanism, which is a device that protects against longer-duration power surges. When connected between an electrical conductor and ground, a fail-short mechanism conducts electrical current only in response to a power surge of a relatively long duration. Once the fail-short mechanism becomes conductive in response to a power surge, it remains conductive at all times thereafter (unless it fails due to inability to carry the fail-short current).

A number of surge protectors which incorporate fail-short mechanisms are disclosed in the prior art. For example, U.S. Pat. No. 5,224,012 to Smith discloses a surge protector for use in telephone central offices having a fail-short mechanism which includes a conductive canister 70, a fusible pellet 72, and a spring 90 which biases the canister 70 downwards. The Smith fail-short mechanism has two operating positions, a first position in which the bottom portion of the canister 70 is spaced from a conductive plate 42, as shown in FIG. 3 of the Smith patent, and a second position in which the canister 70 makes contact with the plate 42, as shown in FIG. 4 of the Smith patent. The Smith fail-short mechanism moves from the first position to the second position when the fusible pellet 72 melts due to a prolonged power surge.

If it were to be used to protect a broadband coaxial system in which signals up to one gigahertz were transmitted, the Smith surge protector described above would adversely affect the frequency response of the system due to the relatively large capacitance between its components, including the capacitance between the canister 70 and the conductive plate 42 as shown in FIG. 3 of the Smith patent. That relatively large capacitance, which fail-short mechanisms typically possess, would prevent higher-frequency signals from being transmitted through the surge protector with acceptable insertion and return losses.

Surge protectors which incorporate fail-short mechanisms must also have a minimum current-carrying capability. Such current-carrying capability is typically defined with respect to a number of minimum current levels and the durations which the fail-short mechanism must carry each of those current levels without failure. For example, standards promulgated by Underwriters Laboratories and Bell Communications Research require that a fail-short mechanism be able to handle the following current levels for at least the following durations: 30 Arms for 15 minutes, 60 Arms for 3 seconds, 120 Arms for 0.6 seconds, and 350 Arms for 40 milliseconds.

A fail-short mechanism having a large current-carrying capacity generally requires a larger structure. However, that larger structure is likely to have a relatively large capacitance, which would limit the use of such a device to lower-frequency systems.

SUMMARY OF THE INVENTION

The present invention is directed to a surge protector adapted for a broadband coaxial system in which electrical signals having a frequency range from DC to one gigahertz may be transmitted. The surge protector has a pair of coaxial cable connectors, a surge protection device, and a fail-short mechanism. The fail-short mechanism has a first operating condition in which the center and outer conductors of the coaxial cable connectors are conductively isolated from each other and a second operating condition in which the center and outer conductors of the coaxial cable connectors are conductively coupled to each other.

The fail-short mechanism preferably has a relatively low capacitance, with respect to the other portions of the surge protector, of not greater than about 20 picofarads, and preferably not greater than about 10 picofarads, when the fail-short mechanism is in the first operating condition. The fail-short mechanism may have a plurality of prongs with terminal edges which are spaced from a conductive member in its first operating condition and which make contact with the conductive member in its second operating condition.

The relatively low capacitive impedance of the fail-short mechanism provides the surge protector with an insertion loss having a magnitude not greater than about −0.2 decibels and a return loss having a magnitude of at least about −20 decibels, and the fail-short mechanism is adapted to conduct a fail-short current having a magnitude of at least about 30 amperes for at least about 15 minutes when the fail-short mechanism is in its second operating condition.

The surge protector may have a dielectric plate with a first longitudinal portion and a second longitudinal portion, the first longitudinal portion having a pair of first outer conductive members and a first inner conductive member having a first capacitance therebetween, and the second longitudinal portion having a pair of second outer conductive members and a second inner conductive member having a second capacitance therebetween. The second capacitance is lower than the first capacitance, and the fail-short mechanism may be disposed substantially adjacent the second longitudinal portion of the dielectric plate. The fail-short mechanism may be disposed adjacent the side of the dielectric plate opposite the side of the plate on which the second outer conductive members are disposed.

These and other features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 2 is a perspective view of the internal structure of the surge protector;

FIG. 3 is a perspective view of the bottom portion of the surge protector;

FIG. 4 is a side elevational view of a portion of the surge protector showing a fail-short mechanism in a first condition;

FIG. 5 is a side elevational view of a portion of the surge protector showing the fail-short mechanism in a second condition;

FIG. 6 is a bottom view of the interior of the housing of the surge protector; and FIG. 7 is a cross-sectional view of the interior of the housing shown in FIG. 6.

DETAILED DESCRIPTION OF A PREFERRED EMBODIMENT

Figure 1:
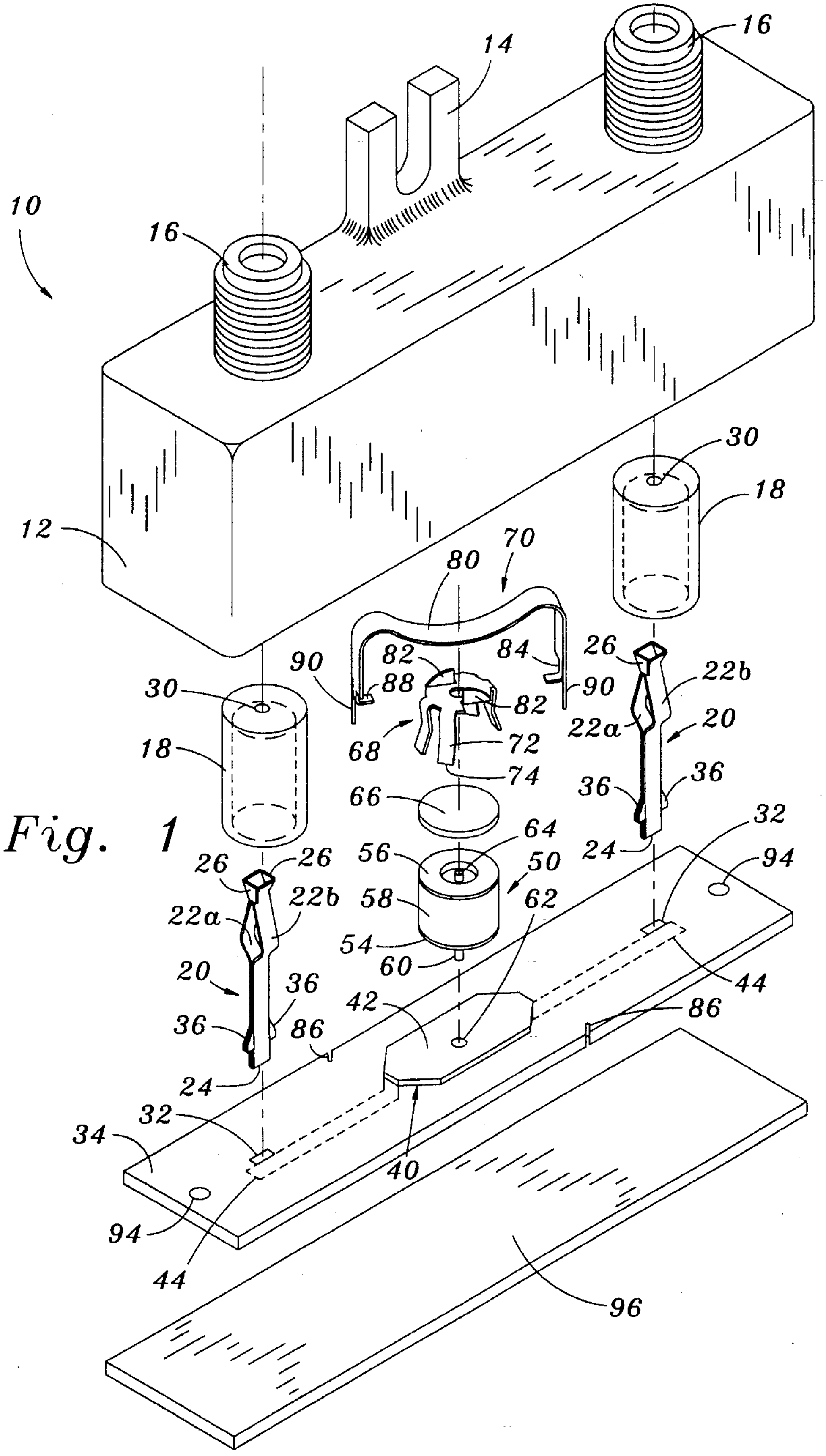
FIG. 1 is an exploded perspective view of a preferred embodiment of a broadband surge protector for a coaxial system in accordance with the invention.

A preferred embodiment of a broadband surge protector 10 in accordance with the invention is illustrated in FIG. 1. The surge protector 10 may be used to protect 50 or 75 ohm coaxial systems having a broad frequency range with a lower frequency limit of DC to an upper frequency limit of at least one gigahertz (1,000 MHz). Referring to FIG. 1, the surge protector 10 has a housing 12 with a mounting bracket 14 integrally formed therewith. The housing 12 may be composed of various materials, such as a zinc die-cast housing with an outer plated tin-lead coating, an aluminum or brass housing, or a plastic housing with a metallic lining or plating. The mounting bracket 14 is preferably connected directly to a source of ground potential so that any surge or fail-short currents are shunted directly to ground. The surge protector 10 has two coaxial connectors, each of which is composed of an externally threaded cylindrical extension 16 integrally formed with the housing 12, a plastic (e.g. teflon) insulating sleeve 18 which is adapted to be disposed within the hollow interior portion of the cylindrical extension 16, and a metal receptacle 20.

The dimensions of the housing 12 may be selected to allow the surge protector 10 to be incorporated in a conventional network interface device (NID) (not shown) in one of two positions, a first position in which the protector 10 is located entirely within the telephone company side of the NID and a second position in which the protector 10 bridges the telephone company and customer sides of the NID. One example of such dimensions would be 3.2 inches in length, 0.75 inches in width and one inch in height.

Each receptacle 20 is composed of a pair of opposed metal strips 22*a*, 22*b*, which may comprise a beryllium-copper alloy, integrally joined together at a bottom end 24. The top of each strip 22*a* has two perpendicular flanges 26 which, together with the top of each strip 22*b*, form a four-sided enclosure at the top of each receptacle 20. The upper portions of the receptacles 20 are disposed within the insulating sleeves 18 so that the four-sided enclosure at the top of each receptacle 20 is positioned directly below a relatively small bore 30 in the top of each insulating sleeve 18.

Each of the connectors is adapted to receive a conventional coaxial connector (not shown) having an internally threaded portion, an outer cylindrical conductor, and a central conductor formed coaxially with the outer cylindrical conductor. When such a connector is screwed onto the externally threaded member 16, the central conductor of the connector passes through the bore 30 in the insulating sleeve 18 and is disposed between the members 22*a*, 22*b* of the receptacle 20, making conductive contact therewith. The outer cylindrical conductor of the connector is conductively coupled to the threaded members 16, and thus to the conductive housing 12.

The bottom end 24 of each receptacle 20 is inserted into a respective slot 32 formed in a dielectric plate 34, which may be a conventional printed circuit board. The depth to which each receptacle 20 is inserted into the dielectric plate 34 is controlled by a pair of outwardly extending flanges 36 formed integrally with the strips 22*a*, 22*b*.

A conductive member in the form of a metal plate 40 is fixed to the dielectric plate 34. The metal plate 40 has a central portion 42 having a first width and a pair of side portions 44 integrally formed therewith which have narrower widths. Each side portion 44 passes through a respective slot (not shown) in the dielectric plate 34, so that the central portion 42 is disposed on the top side of the plate 34 and the side portions 44 are disposed on the bottom side of the plate 34. As shown in FIG. 3, each bottom end 24 of the receptacles 20 passes through a respective slot in the conductive side portion 44, and the ends 24 are soldered to the conductive side portions 44 to ensure that the ends are conductively coupled to the side portions 44. The conductive side portions 44 of the metal plate 40 must be of sufficient thickness to carry surge and fail-short currents without failure. To that end, the current-carrying capability of the side portions 44 may be reinforced by copper portions plated on the dielectric plate 34 directly beneath the side portions 44.

The surge protector 10 includes a surge protection device 50 and a fail-short mechanism. The surge protection device 50 may be any type of conventional surge protector, such as a spark gap device, which conducts electrical current across its terminals only when the voltage across its terminals reaches a predetermined value. The particular type of the surge protection device 50 and its associated breakdown voltage depends upon the application in which the surge protector 10 is used. For example, if telephone signals are carried by the coaxial cable to which the surge protector 10 is connected, ring voltages greater than 100 Vrms and battery voltages greater than 130 Vdc may be present, thus necessitating the use of a surge protection device 50 having a DC breakdown voltage of at least about 300 V. For other applications, lower or higher breakdown voltages may be used.

The surge protection device 50 may be a gas discharge tube having a first terminal in the form of an annular metal disk 54, a second terminal in the form of an annular metal disk 56, a hollow cylindrical dielectric member 58 disposed between the disks 54, 56, and a conventional internal structure (not shown) in the form of a pair of circular metal electrodes spaced slightly apart to precisely define a spark gap, each electrode being formed integrally with and extending from one of the disks 54, 56. The surge protection device 50 may be provided with one of various gases to alter the threshold voltage at which it becomes conductive.

The surge protection device 50 has a lower positioning pin 60 which is disposed within a bore 62 formed in the central portion 42 of the metal plate 40 and the dielectric plate 34 and an upper pin 64 (the surge protection device 50 is a conventional device in which the pins 60, 64 may act as electrical terminals when the device 50 is used in other applications). Instead of using the pin 60 as a positioning pin, the surge protection device 50 could be positioned via a pin or bump (not shown) which extends upwardly from the central portion 42 into a recess formed in the bottom of the surge protection device 50.

The fail-short mechanism comprises a meltable member in the form of a disk 66, a fail-short cage 68, and a spring 70 for biasing the fail-short cage 68 downwardly against the disk 66. The disk 66 may be composed of a metallic material comprising, for example, 63% tin and 37% lead. The fail-short cage 68 has four downwardly pointing prongs 72, each having a lower terminal edge 74.

The spring 70 has an arcuate central portion 80 which is held in place above the fail-short cage 68 between a pair of upwardly extending flanges 82 integrally formed with the fail-short cage 68. The spring 70 has a pair of side portions 84 which are positioned within a pair of angularly disposed slots 86 in the dielectric plate 34, and a pair of flanges 88 perpendicular to the side portions 84 hold the spring 70 in place on the dielectric plate 34. Each lower end of the spring 70 has a relatively thin extension 90 which passes below the bottom side of the plate 34 (as shown in FIG. 2). The spring 70 is disposed at an angle with respect to the dielectric plate 34, and the extensions 90 of the spring 70 are bent outwardly so that they make physical and conductive contact with the interior of the conductive housing 12 to short the spring 70 to the housing 12 to reduce the spring-to-housing stray capacitance.

The dielectric plate 34 may be attached within the housing 12 with a pair of screws 92 (shown in FIG. 3) which pass through a pair of mounting holes 94 in the plate 34 and into a pair of threaded bores 95 (shown in FIG. 6) in the interior of the housing 12. Prior to inserting the dielectric plate 34 into the housing 12, the extensions 90 of the spring 70 are bent outwardly to ensure that, when the plate 34 is inserted into the housing 12, the extensions 90 make physical, conductive contact with the interior surface of the housing 12. After the dielectric plate 34 is attached within the housing 12, a metal cover 96 is fixed to the housing 12, such as by inserting it within the housing 12 until it makes contact with a circumferential ledge 98 (shown in FIG. 3) formed in the interior of the housing 12, and by soldering it in place. Alternatively, the cover 96 could be attached with conductive adhesive instead of soldering. A conductive cover-to-housing seal is necessary to achieve good electrical shielding.

Referring to FIG. 3, the bottom side of the dielectric plate 34 has a conductive layer 100, which may be formed by any conventional plating process, about its periphery. In a first longitudinal portion of the dielectric plate 34, the conductive layer 100 has a pair of outer portions **100*a*, 100*b* each of which has a relatively constant width. In a second longitudinal portion of the plate 34, the conductive layer 100 has a pair of outer portions 100*c*, 100*d*, each of which has a relatively constant width that is smaller than the width of the conductive portions 100*a*, 100*b*. In a third longitudinal portion of the plate 34, the conductive layer 100 has a pair of outer portions 100*e*, 100*f*, each of which has a relatively constant width that is substantially the same as the width of the conductive portions 100*a*, 100*b*. At the ends of the dielectric plate 34, the conductive layer 100 includes a pair of conductive portions 100*g*, 100*h*, each of which has a circular internal border that is centered approximately about a respective bottom end 24 of each receptacle 20. The conductive portion 100, the dielectric plate 34, and the metal plate 40 together form a coplanar strip line having an impedance which substantially matches that of coaxial cable to which the surge protector 10** is attached.

Referring to FIG. 1, it should be noted that, when the surge protector 10 is assembled, the bottom terminal 54 of the surge protection device 50 is conductively coupled to the top portions of each of the metal receptacles 20, via the conductive contact between the terminal 54 and the metal plate 40 and the conductive contact between the metal plate 40 and the bottom end 24 of each receptacle 20.

It should also be noted that the top terminal 56 of the surge protection device 50 is conductively coupled to the externally threaded portions 16 of the housing 12 via two conductive paths. One conductive path comprises the solder disk 66, the shorting cage 68, the spring 70, the spring flanges 88, the conductive layer 100 (see FIG. 3), the screws 92, and the housing 12 into which the screws 92 are threaded. A second conductive path comprises the solder disk 66, the shorting cage 68, the spring portion 80, and the housing 12 with which the spring extensions 90 make conductive contact (see FIG. 3).

Referring to FIGS. 6 and 7, the interior of the housing 12 has a central portion 110 which extends the entire depth of the housing 12 to accommodate the elevation of the spring 70 and a pair of mounting members 112 in which the insulating sleeves 18 are disposed and which support the dielectric plate 34. Each mounting member 112 is partially surrounded by two L-shaped grooves or slots 114, and each mounting member 112 has a through-bore 113 into which a respective one of the insulating sleeves 18 is disposed. Each through-bore 113 extends into one of the threaded extensions 16. A relatively shallow annular recess 116 is formed around each through-bore 113, and a slot 118 is formed in the mounting member 112 (each slot 118 is roughly three times the depth of each recess 116). The ledge 98 (shown in FIG. 3) is not shown in FIGS. 6 and 7 for purposes of simplicity.

In operation, when the surge protector 10 is connected between a pair of coaxial cables, the surge protection device 50 protects against relatively short duration power surges which may occur across the central and outer conductors of the coaxial cable. In the event a longer-term power surge of sufficiently high magnitude is developed across the central and outer conductors of the coaxial cable, such as by AC power cross or AC current induction for example, the surge protection device 50 conducts for a relatively long period of time, during which the surge protection device 50 generates sufficient heat to melt the solder disk 66. When the disk 66 melts, the spring 70 forces the fail-short cage 68 downwards until the ends 74 of the prongs 72 make contact with the central portion 42 of the metal plate 40. Consequently, fail-short current flows from the receptacles 20, through the side portions 44 and the central portion 42 of the plate 40, through the prongs 72 and through the spring 70 to the housing 12, which is connected to a ground connection via the mounting bracket 14. The fail-short current may flow from the spring 70 to the housing 12 via two different paths: 1) from the spring extensions 90 directly to the housing 12, and 2) from the spring flanges 88 through the conductive portion 100 and the screws 92 and into the housing 12.

The structure of the fail-short mechanism allows the surge protector 10 to carry at least the following current levels for at least the following durations in its fail-short condition: 30 Arms for 15 minutes, 60 Arms for 3 seconds, 120 Arms for 0.6 seconds, and 350 Arms for 40 milliseconds, while at the same time allowing the surge protector 10 to have an impedance that is substantially the same as a conventional 75 ohm (or 50 ohm) coaxial cable. In that regard, the internal components of the surge protector 10 have been selected to model a coplanar strip line having a roughly equal impedance at all longitudinal points along the protector 10.

It should be noted that, due to symmetry, the capacitance between the outer conductive portions **100*a*, 100*b* and the associated inner conductive portion 44 is the same as the capacitance between the outer conductive portions 100*e*, 100*f* and their associated inner conductive portion 44**. To make the capacitance between the outer conductive portions

100*c*, 100*d* and their associated inner conductive portions (including the central portion 42 of the metal plate 40 and the fail-short mechanism) roughly similar to the capacitances described directly above, the capacitance contributed by the fail-short mechanism has been minimized, as described below.

To lessen the capacitance between the fail-short mechanism and the outer conductive portions 100*c*, 100*d* in the central longitudinal portion of the dielectric plate 34, the fail-short mechanism is placed on the opposite side of the dielectric plate 34 as the conductive portions 100*c*, 100*d* (the presence of the dielectric plate 34 between the respective conductive components reduces the capacitance), and the width of the outer conductive portions 100*c*, 100*d* has been reduced with respect to the width of the other outer conductive portions 100*a*, 100*b*, 100*e*, 100*f*.

To further minimize the capacitance, the fail-short cage 68 is provided with only four prongs 68 (this reduces the capacitance between the prongs 68 and the plate portion 42), the bottom portions of those prongs 68 are bent slightly outwardly (this reduces the capacitance between the ends 74 of the prongs 68 and the lower end of the surge protection device 50), and the spring 70 is disposed diagonally within the surge protector 10 (this reduces the capacitance between the spring 70 and the plate portion 42). Consequently, the capacitance between the fail-short mechanism and the conductive portions 100*c*, 100*d* is less than about 20 picofarads, preferably less than about 10 picofarads, and may be less than five picofarads. The overall capacitance of the surge protector 10 (measured as the capacitance between the cylindrical portions 16 and top portions of the receptacles 20) is also less than 20 picofarads, and may be less than about 10 picofarads.

As a consequence of the low-capacitive impedance of the fail-short mechanism and the surge protector 10 described above, the surge protector 10 is capable of being used in a coaxial system having a broadband frequency range which extends from DC to at least about one gigahertz with an insertion loss having a magnitude not greater than about −0.2 decibels (dB) and a return loss having a magnitude of at least about −20 dB. The return loss may have a magnitude of at least about −25 dB. Alternatively, the frequency range may extend from at least about 50 MHz to at least about one gigahertz (1,000 MHz).

As used herein, the insertion loss caused by the insertion of a device in a coaxial system is defined in accordance with the following equation:

$$\text{Insertion Loss (dB)}=10 \log P1/P2,$$

where P1 represents the power transmitted to a load with an inserted device and P2 represents the power transmitted to the load without the device. Thus, a device having an insertion loss with a magnitude of −3 dB would cause, by its insertion into a system, the power transmitted to the load to be cut in half. It should be noted that, since P1 will always be less than P2 (for a passive device), the insertion loss will always be a negative number.

The return loss caused by the insertion of a device in a coaxial system is defined in accordance with the following equation:

$$\text{Return Loss (dB)}=20 \log Cr$$

where Cr is the reflection coefficient, which is the ratio of the reflected voltage caused by the insertion of a device to the initial voltage transmitted towards the device, Vr/Vi. For example, where 10% of a forward-travelling voltage is reflected by an inserted device (reflection coefficient of 10%), the return loss would be −20 dB. Where only 5.6% of a forward travelling voltage is reflected by an inserted device, the return loss would be −25 dB. It should be noted that, since the reflection coefficient is always less than one, the return loss will always be a negative number.

As used herein, the term "magnitude" refers to the absolute value of the loss, regardless of the sign of the loss. Thus, for example, an insertion loss of −1 dB has a greater magnitude that an insertion loss of −0.2 dB.

The structural details of the surge protector 10 may be modified in various ways. For example, instead of the angularly disposed slots 86, triangular cutouts (not shown) could be made instead to make the spring 70 easier to place on the dielectric plate 34. Instead of providing the plate 40 with relatively long extensions 44 on both sides, the plate 40 could be provided with a pair of short extensions which extend only slightly through the dielectric plate 34. The ends of the short extensions could then be conductively connected to bottom ends 24 of the receptacles 20 via a conductive plated coating of a thickness sufficient to carry the fail-short currents described above. Alternatively, each of the short extensions could be conductively connected to one of the bottom ends 24 of the receptacles 20 by a conductive plate (having the same width as the side portions 44) with two ends, each of which has a crossed slot (shaped like "+") formed therein, with a bottom end 24 passing through one of the crossed slots and one of the short extensions passing through the other crossed slot.

Other modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A surge protector adapted for a coaxial system, said surge protector comprising:
   - a first connector adapted to be connected to a coaxial cable connector, said first connector having a first conductive portion and a second conductive portion;
   - a second connector adapted to be connected to a coaxial cable connector, said second connector having a first conductive portion and a second conductive portion;
   - a dielectric plate having a first longitudinal portion and a second longitudinal portion,
     - said first longitudinal portion having a pair of first outer conductive members and a first inner conductive member, said first outer conductive members and said first inner conductive member having a first capacitance therebetween,
     - said second longitudinal portion having a pair of second outer conductive members and a second inner conductive member, said second outer conductive members and said second inner conductive member having a second capacitance therebetween, said second capacitance being lower than said first capacitance,
     - said first and second outer conductive members being conductively coupled to said first conductive portion of said first connector and said first conductive portion of said second connector;

a surge protection device having a first terminal conductively coupled to said first conductive portions of said first and second connectors and a second terminal conductively coupled to said second conductive portions of said first and second connectors;

a fail-short mechanism having a first operating condition in which said first conductive portions of said first and second connectors are conductively isolated from said second conductive portions of said first and second connectors and a second operating condition in which said first conductive portions of said first and second connectors are conductively coupled to said second conductive portions of said first and second connectors, said fail-short mechanism being disposed substantially adjacent said second longitudinal portion of said dielectric plate.

2. A surge protector as defined in claim 1 wherein said dielectric plate has a third longitudinal portion, wherein said second longitudinal portion is disposed between said first and third longitudinal portions, and wherein said third longitudinal portion has a pair of third outer conductive members and a third inner conductive member, said third outer conductive members and said third inner conductive member having a third capacitance therebetween, said third capacitance being substantially equal to said first capacitance.

3. A surge protector as defined in claim 1 wherein said dielectric plate has a first side and a second side opposite said first side, wherein said first and second outer conductive members and said first inner conductive member are disposed on said first side of said dielectric plate, and wherein said second inner conductive member is disposed on said second side of said dielectric plate.

4. A surge protector as defined in claim 3 wherein said fail-short mechanism is disposed adjacent said second side of said dielectric plate.

5. A surge protector as defined in claim 1 wherein said first outer conductive members have a first width and wherein said second outer conductive members have a second width, said second width being smaller than said first width.

6. A surge protector as defined in claim 1 wherein said first inner conductive member has a first width and wherein said second inner conductive member has a second width, said second width being larger than said first width.

7. A surge protector as defined in claim 1 wherein said first inner conductive member is conductively coupled to said second inner conductive member.

8. A surge protector as defined in claim 1 wherein said fail-short mechanism comprises a plurality of prongs, each of said prongs having a terminal edge, said terminal edges of said prongs being spaced from said second inner conductive member in said first operating condition of said fail-short mechanism, said terminal edges of said prongs making contact with said second inner conductive member in said second operating condition of said fail-short mechanism.

9. A surge protector as defined in claim 8 wherein said fail-short mechanism additionally comprises means for spring-biasing said prongs towards said second inner conductive member.

10. A surge protector as defined in claim 8 wherein said fail-short mechanism additionally comprises:

a spring which biases said terminal edges of said prongs towards said second inner conductive member; and a meltable member which allows said spring to force said terminal edges of said prongs in contact with said second inner conductive member when said meltable member melts during a power surge condition.

11. A surge protector as defined in claim 1 wherein said surge protection device comprises a spark gap device.

12. A surge protector adapted for a coaxial system, said surge protector comprising:

a first connector adapted to be connected to a coaxial cable connector, said first connector having a first conductive portion and a second conductive portion;

a second connector adapted to be connected to a coaxial cable connector, said second connector having a first conductive portion and a second conductive portion;

a surge protection device having a first terminal conductively coupled to said first conductive portions of said first and second connectors and a second terminal conductively coupled to said second conductive portions of said first and second connectors;

a conductive member conductively coupled to one of said conductive portions of said first connector and one of said conductive portions of said second connector; and a fail-short mechanism having a first operating condition in which said first conductive portions of said first and second connectors are conductively isolated from said second conductive portions of said first and second connectors and a second operating condition in which said first conductive portions of said first and second connectors are conductively coupled to said second conductive portions of said first and second connectors, said fail-short mechanism comprising a plurality of prongs, each of said prongs having a terminal edge, said terminal edges of said prongs being spaced from said conductive member in said first operating condition of said fail-short mechanism, said terminal edges of said prongs making contact with said conductive member in said second operating condition of said fail-short mechanism, said fail-short mechanism and said conductive member having a capacitance therebetween of not greater than about 20 picofarads when said fail-short mechanism is in said first operating condition.

13. A surge protector as defined in claim 12 wherein said fail-short mechanism and said conductive member have a capacitance therebetween of not greater than about 10 picofarads when said fail-short mechanism is in said first operating condition.

14. A surge protector as defined in claim 12 additionally comprising a dielectric plate having a first side and a second side opposite said first side, said first side of said dielectric plate having said conductive member disposed thereon, said fail-short mechanism being disposed adjacent said second side of said dielectric plate.

15. A surge protector as defined in claim 14 wherein said dielectric plate has a periphery and wherein said conductive member is disposed about said periphery of said dielectric plate.

16. A surge protector as defined in claim 12 wherein said fail-short mechanism additionally comprises:

a spring which biases said prongs towards a second conductive member; and a meltable member which allows said spring to force said prongs in contact with said second conductive member when said meltable member melts during a power surge condition.

17. A surge protector adapted for a coaxial system, said surge protector comprising:

a first connector adapted to be connected to a coaxial cable connector, said first connector having a first conductive portion and a second conductive portion;

a second connector adapted to be connected to a coaxial cable connector, said second connector having a first conductive portion and a second conductive portion;

a dielectric plate having a first side and a second side opposite said first side, said first side of said dielectric plate having an outer conductive portion which is conductively coupled to said first conductive portion of said first connector and said first conductive portion of said second connector;

a surge protection device having a first terminal conductively coupled to said first conductive portions of said first and second connectors and a second terminal conductively coupled to said second conductive portions of said first and second connectors;

a fail-short mechanism having a first operating condition in which said first conductive portions of said first and second connectors are conductively isolated from said second conductive portions of said first and second connectors and a second operating condition in which said first conductive portions of said first and second connectors are conductively coupled to said second conductive portions of said first and second connectors, said fail-short mechanism being disposed adjacent said second side of said dielectric plate.

18. A surge protector as defined in claim 17 wherein said fail-short mechanism and said outer conductive portion have a capacitance therebetween of not greater than about 20 picofarads.

19. A surge protector as defined in claim 17 wherein said fail-short mechanism and said outer conductive portion have a capacitance therebetween of not greater than about 10 picofarads.

20. A surge protector as defined in claim 17 wherein said surge protection device comprises a spark gap device.

21. A surge protector as defined in claim 17 wherein said dielectric plate has a periphery and wherein said outer conductive portion is disposed about said periphery of said dielectric plate.

22. A surge protector as defined in claim 17 additionally comprising a conductive member disposed on said second side of said dielectric plate, wherein said fail-short mechanism comprises a plurality of prongs, each of said prongs having a terminal edge, said terminal edges of said prongs being spaced from said conductive member in said first operating condition of said fail-short mechanism, said terminal edges of said prongs making contact with said conductive member in said second operating condition of said fail-short mechanism.

23. A surge protector as defined in claim 22 wherein said fail-short mechanism additionally comprises:

a spring which biases said prongs towards said conductive member; and a meltable member which allows said spring to force said prongs in contact with said conductive member when said meltable member melts during a power surge condition.

24. A surge protector adapted for a coaxial system, said surge protector comprising:

a first connector adapted to be connected to a coaxial cable connector, said first connector having a first conductive portion and a second conductive portion;

a second connector adapted to be connected to a coaxial cable connector, said second connector having a first conductive portion and a second conductive portion;

a surge protection device having a first terminal conductively coupled to said first conductive portions of said first and second connectors and a second terminal conductively coupled to said second conductive portions of said first and second connectors;

a fail-short mechanism having a first operating condition in which said first conductive portions of said first and second connectors are conductively isolated from said second conductive portions of said first and second connectors and a second operating condition in which said first conductive portions of said first and second connectors are conductively coupled to said second conductive portions of said first and second connectors, said fail-short mechanism being adapted to conduct at least about 30 amperes of current for at least about 15 minutes when said fail-short mechanism is in said second operating condition, said fail-short mechanism having an impedance which provides said surge protector with an insertion loss having a magnitude not greater than about –0.2 decibels over a frequency range of at least about 50 megahertz to at least about one gigahertz and a return loss having a magnitude of at least about –20 decibels over a frequency range of at least about 50 megahertz to at least about one gigahertz.

25. A surge protector as defined in claim 24 additionally comprising a conductive member interconnecting one of said conductive portions of said first connector with one of said conductive portions of said second connector, wherein said fail-short mechanism and said conductive member have a capacitance therebetween of not greater than about 20 picofarads.

26. A surge protector as defined in claim 24 additionally comprising a conductive member interconnecting one of said conductive portions of said first connector with one of said conductive portions of said second connector, wherein said fail-short mechanism and said conductive member have a capacitance therebetween of not greater than about 10 picofarads.

27. A surge protector as defined in claim 24 wherein said fail-short mechanism is adapted to conduct at least about 60 amperes of current for at least about 3 seconds when said fail-short mechanism is in said second operating condition.

28. A surge protector as defined in claim 24 wherein said fail-short mechanism is adapted to conduct at least about 120 amperes of current for at least about 0.6 seconds when said fail-short mechanism is in said second operating condition.

29. A surge protector as defined in claim 24 wherein said fail-short mechanism is adapted to conduct at least about 350 amperes of current for at least about 40 milliseconds when said fail-short mechanism is in said second operating condition.

30. A surge protector as defined in claim 24 wherein said impedance of said fail-short mechanism provides said surge protector with an insertion loss having a magnitude not greater than about –0.2 decibels over a frequency range of DC to at least about one gigahertz and a return loss having a magnitude of at least about –20 decibels over a frequency range of DC to at least about one gigahertz.

31. A surge protector as defined in claim 24 wherein said return loss has a magnitude that is at least about –25 decibels over a frequency range of at least about 50 megahertz to at least about one gigahertz.

32. A surge protector as defined in claim 24 additionally comprising a dielectric plate having a coplanar strip line formed thereon.

* * * * *